US012161898B2

(12) United States Patent
Gomez Rodriguez et al.

(10) Patent No.: US 12,161,898 B2
(45) Date of Patent: Dec. 10, 2024

(54) ADJUSTABLE FACE MASK ASSEMBLY

(71) Applicant: Honeywell International Inc., Charlotte, NC (US)

(72) Inventors: Oliver Gomez Rodriguez, Mexico City (MX); Rodrigo Marin Barroeta, Mexico City (MX); Edgar Ricardo Bautista Lopez, Mexico City (MX); Tanguy Prevot, Moravany u Brna (CZ); Joseph Rodrigues, Morris Plains, NJ (US); Marie Hammer, Cranston, RI (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/528,654

(22) Filed: Dec. 4, 2023

(65) Prior Publication Data

US 2024/0100368 A1 Mar. 28, 2024

Related U.S. Application Data

(63) Continuation of application No. 16/599,876, filed on Oct. 11, 2019, now Pat. No. 11,865,381.

(51) Int. Cl.
*A62B 9/04* (2006.01)
*A41D 13/11* (2006.01)
(Continued)

(52) U.S. Cl.
CPC ............ *A62B 9/04* (2013.01); *A41D 13/1161* (2013.01); *A62B 7/10* (2013.01); *A62B 23/02* (2013.01)

(58) Field of Classification Search
CPC ......... A62B 9/00; A62B 9/04; A62B 7/00–14; A62B 23/00–025; A41D 13/11; A41D 13/1161
See application file for complete search history.

(56) References Cited

U.S. PATENT DOCUMENTS 4,924,557 A 5/1990 Heckerman et al.
5,464,010 A * 11/1995 Byram ................ A62B 18/084 128/206.17

(Continued)

FOREIGN PATENT DOCUMENTS

EP 0808641 A1 11/1997
KR 10-1723421 B1 4/2017

OTHER PUBLICATIONS

Advisory Action (PTOL-303) Mailed on Jun. 1, 2023 for U.S. Appl. No. 16/599,876, 3 page(s).

(Continued)

*Primary Examiner* — Rachel T Sippel
*Assistant Examiner* — Jacqueline M Pinderski
(74) *Attorney, Agent, or Firm* — Alston & Bird LLP

(57) ABSTRACT

A face mask assembly configured with a drop down feature and a method of manufacturing the same are provided. The face mask assembly includes a face mask component slidable along a length of at least a first strap. The face mask component includes a first dynamic strap engagement feature defining a slide portion and a locking portion to engage the first strap. The slide portion includes a smooth edge such that the face mask component is slidable along the length of the first strap while the first strap is positioned within the slide portion. The locking portion includes a sharp edge to provide frictional restriction to the first strap during operation such that face mask component is locked relative to the length of the first strap while the first strap is positioned within the locking portion. A corresponding method of manufacture is also provided.

20 Claims, 15 Drawing Sheets

(51) Int. Cl.
*A62B 7/10* (2006.01)
*A62B 23/02* (2006.01)

(56) References Cited

U.S. PATENT DOCUMENTS

| | | | | |
|---|---|---|---|---|
| 6,062,221 | A * | 5/2000 | Brostrom | A41D 13/1146 128/206.28 |
| 6,381,816 | B1 | 5/2002 | Lai et al. | |
| 8,281,413 | B2 | 10/2012 | Ly | |
| 2002/0078953 | A1* | 6/2002 | Fecteau | A62B 18/084 128/207.11 |
| 2010/0263673 | A1* | 10/2010 | Kielow | A62B 18/025 128/206.15 |

OTHER PUBLICATIONS

Advisory Action (PTOL-303) Mailed on Oct. 21, 2022 for U.S. Appl. No. 16/599,876, 3 page(s).
EP Office Action Mailed on Nov. 21, 2023 for EP Application No. 20199097, 4 page(s).
European search opinion Mailed on Feb. 24, 2021 for EP Application No. 20199097, 2 page(s).
European search report Mailed on Feb. 24, 2021 for EP Application No. 20199097, 2 page(s).
Examiner Interview Summary Record (PTOL-413) Mailed on Oct. 21, 2022 for U.S. Appl. No. 16/599,876, 3 page(s).
Examiner Interview Summary Record (PTOL-413) Mailed on Sep. 15, 2023 for U.S. Appl. No. 16/599,876, 1 page(s).
Final Rejection Mailed on Jul. 27, 2022 for U.S. Appl. No. 16/599,876, 18 page(s).
Final Rejection Mailed on Mar. 9, 2023 for U.S. Appl. No. 16/599,876, 12 page(s).
Honeywell HM500 Series Half Mask User Instructions, 20 pages.
Non-Final Rejection Mailed on Apr. 11, 2022 for U.S. Appl. No. 16/599,876, 17 page(s).
Non-Final Rejection Mailed on Nov. 22, 2022 for U.S. Appl. No. 16/599,876, 21 page(s).
Notice of Allowance and Fees Due (PTOL-85) Mailed on Sep. 15, 2023 for U.S. Appl. No. 16/599,876, 11 page(s).
U.S. Appl. No. 16/599,876, filed Oct. 11, 2019, U.S. Pat. No. 11,865,381, Patented.

* cited by examiner

ADJUSTABLE FACE MASK ASSEMBLY

CROSS-REFERENCE TO RELATED APPLICATIONS

This patent application is a continuation of U.S. patent application Ser. No. 16/599,876, filed Oct. 11, 2019, which is incorporated herein by reference in its entirety.

TECHNOLOGICAL FIELD

Example embodiments of the present disclosure relate generally to a face mask assembly and, more particularly, to a face mask assembly with a drop-down function to alternate between a donned position and a drop down position.

BACKGROUND

First responders, soldiers, and others often work in hazardous environments that require personal protective equipment such as respirators and other breathing-related protective equipment. These hazardous environments may contain airborne contaminants that require face masks that provide consistent sealing during operation. Current face masks, however, can be time consuming to remove and/or to replace on the user's face while ensuring a consistent seal is maintained between the mask and the user's face against contamination.

BRIEF SUMMARY

Various embodiments are provided herein for an adjustable face mask assembly. In an example embodiment, a face mask assembly is provided with a drop down feature. The face mask assembly includes a face mask component slidable along a length of at least a first strap. The face mask component includes a first dynamic strap engagement feature configured to engage the first strap and the first dynamic strap engagement feature defines a slide portion and a locking portion. The slide portion includes a smooth edge such that the face mask component is slidable along the length of the first strap while the first strap is positioned within the slide portion. The locking portion includes a sharp edge configured to provide frictional restriction to the first strap during operation such that face mask component is locked relative to the length of the first strap while the first strap is positioned within the locking portion.

In some embodiments, the face mask component further includes a first secondary strap engagement feature having a uniform height and the first strap is further configured to be received by the first secondary strap engagement feature of the face mask component. In some embodiments, the face mask component further includes a strap pathway within an interior of the face mask component and extending between the first dynamic strap engagement feature and the first secondary strap engagement feature configured to provide additional torsional force to the first strap during operation.

In some embodiments, the face mask component further includes a second dynamic strap engagement feature configured to engage a second strap and the second dynamic strap engagement feature defines a slide portion and a locking portion. In such an embodiment, the face mask component is slidable along the length of the second strap while the second strap is positioned within the slide portion and the face mask component is locked relative to the length of the second strap while the second strap is positioned within the locking portion. In some embodiments, the face mask assembly also includes a head support component. In such an embodiment, the first strap and the second strap each include a head support end and an attachment end, the first strap and the second strap are attached to the head support component at the head support end of each strap, and the attachment ends of each of the first strap and the second strap are removably coupled to one another. In some embodiments, the face mask component includes a face engagement portion defining a breathing chamber within the interior of the face mask component and a strap engagement portion including the first dynamic strap engagement feature.

In some embodiments, the face mask component is configured to alternate between a donned position and a drop-down position. In such an embodiment, in an instance the face mask component is in the donned position, the first strap is positioned within the first dynamic engagement feature such that the movement of the first strap is restricted. In some embodiments, the first dynamic strap engagement feature has an overall width defined as the combined width of the slide portion and the locking portion and the width of the slide portion is greater than a width of the first secondary strap engagement feature. In some embodiments, a height of the locking portion of the first dynamic engagement feature is less than a height of the slide portion of the first dynamic engagement feature. In some embodiments, a width of the slide portion of the first dynamic engagement feature is at least the width of the first strap.

In another example embodiment, a method of manufacturing a face mask assembly configured with a drop down feature is provided. The method includes providing a face mask component slidable along a length of at least a first strap. The face mask component includes a first dynamic strap engagement feature configured to engage the first strap. The method also includes defining the slide portion within the first dynamic strap engagement feature. The slide portion includes a smooth edge such that the face mask component is slidable along the length of the first strap while the first strap is positioned within the slide portion. The method further includes defining the locking portion within the first dynamic strap engagement feature. The locking portion includes a sharp edge configured to provide frictional restriction to the first strap during operation such that face mask component is locked relative to the length of the first strap while the first strap is positioned within the locking portion.

In some embodiments, the face mask component also includes a first secondary strap engagement feature configured with a uniform height and the first strap is further configured to be received by the first secondary strap engagement feature of the face mask component. In some embodiments, the face mask component also includes a strap pathway within an interior of the face mask component and extending between the first dynamic strap engagement feature and the first secondary strap engagement feature configured to provide additional torsional force to the first strap during operation.

In some embodiments, the face mask component also includes a second dynamic strap engagement feature configured to engage a second strap and the second dynamic strap engagement feature defines a slide portion and a locking portion. In such embodiments, the face mask component is slidable along the length of the second strap while the second strap is positioned within the slide portion and the face mask component is locked relative to the length of the second strap while the second strap is positioned within the locking portion.

In some embodiments, the method also includes providing a head support component. In such embodiments, the first strap and the second strap each include a head support end and an attachment end, the first strap and the second strap are attached to the head support component at the head support end of each strap, and the attachment ends of each of the first strap and the second strap are removably coupled to one another. In some embodiments, the face mask component includes a face engagement portion defining a breathing chamber within the interior of the face mask component and a strap engagement portion including the first dynamic strap engagement feature. In some embodiments, the face mask component is configured to alternate between a donned position and a drop-down position. In such an embodiment, in an instance the face mask component is in the donned position, the first strap is positioned within the first dynamic engagement feature such that the movement of the first strap is restricted.

In some embodiments, the first dynamic strap engagement feature has an overall width defined as the combined width of the slide portion and the locking portion. In such an embodiment, the width of the slide portion is greater than a width of the first secondary strap engagement feature. In some embodiments, a height of the locking portion of the first dynamic engagement feature is less than a height of the slide portion of the first dynamic engagement feature. In some embodiments, a width of the slide portion of the first dynamic engagement feature is at least the width of the first strap.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

Various embodiments herein provide a face mask assembly with a drop down function and a method of manufacturing the same. Current face masks, while effective when donned by a user, are often difficult to remove and reapply to a user's face (to move between the donned position in which the mask is applied to the user's face to form a seal therewith and a removed position in which the mask is not applied to the user's face. Embodiments discussed herein include a drop-down function that allows for a user to quickly and effectively don and remove the mask during operation, while supporting the mask for quick access when in drop-down position (e.g., dangling by straps from the user's head). The ability to quickly transition between the donned position and the drop-down position enables a more efficient user experience, especially in situations where a user may have to quickly alternate between donning and removing the face mask. In certain embodiments, the mask itself interacts with support straps via dynamic strap engagement features configured to efficiently and reversibly lock the mask in the donned position to impede unintentional dislocation of the mask during use. The dynamic strap engagement features are integrated as a features of the face mask itself, which also facilitates the manufacturing process of the face mask because external components, such as external locking mechanisms are not needed for the face mask assembly of example embodiments.

Figure 1:
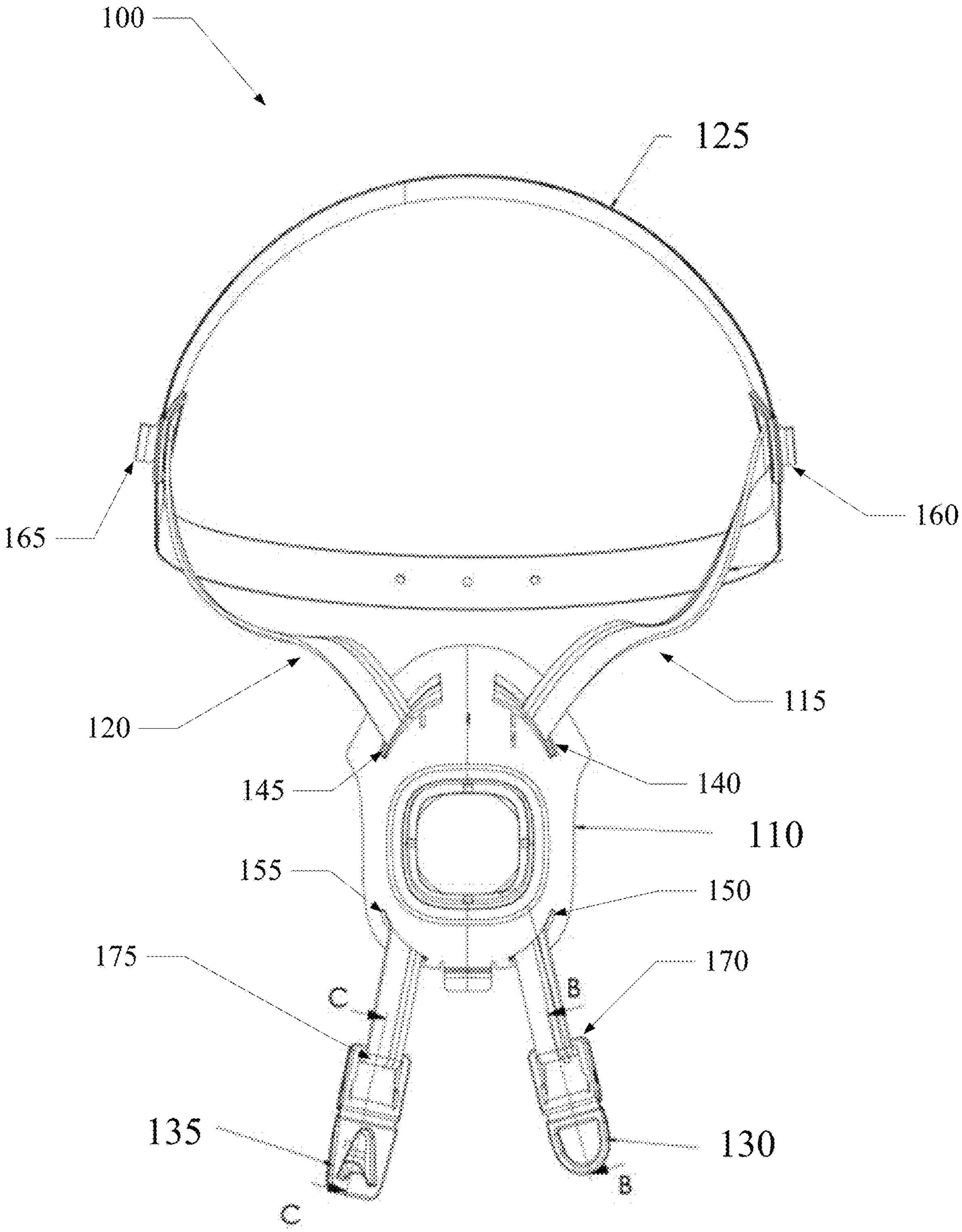
FIG. 1 is a face mask assembly in accordance with an example embodiment of the present disclosure.

Referring now to FIG. 1, an example face mask assembly 100 is shown in accordance with the present disclosure. The face mask assembly 110 may include a face mask component 110, a first strap 115, a second strap 120, and a head support component 125 (e.g., an adjustable head band that may be resized as necessary to accommodate a particular user's head). In various embodiments, the face mask assembly 100 may be configured to be operably coupled with the head and face of a user during operation.

In the illustrated embodiment, the face mask component 110 defines a mask body defining an interior volume. The mask body defines an exterior surface and an opposite interior surface surrounding interior volume. Moreover, as shown, the mask body may have an open end configured to be placed against a user's face, such that the user's mouth and/or nose is positioned within the interior volume. The open end of the mask body may be surrounded by a seal, such as a resilient/flexible sealing member (e.g., a rubber sealing member, a flexible polymer sealing member, and/or the like) configured to form a seal between the mask body and the user's face. The seal may be configured to contour to a user's face, and the resilience/flexibility of the seal may be configured to accommodate differences in the shape of various users' faces. In certain embodiments, the seal may be customized (e.g., through a thermoforming process) to a particular user's face, however it should be understood that other embodiments may provide at least substantially universal seal configurations configured to accommodate a plurality of user face shapes.

Moreover, the mask body may comprise a rigid and at least substantially gas impermeable material, such as polyvinyl chloride, polycarbonate, fiberglass, carbon fiber, and/or the like. As shown in certain of the figures, the mask body may define one or more intake and/or exhaust valves, which may be configured to accept particulate, odor, and/or other breathing-based filters (or closed air sources). In certain embodiments, these intake and/or exhaust valves may extend through the mask body, between the external surface and an interior surface, so as to enable air to pass into the interior of the mask for the user to breathe (e.g., after passing through desired filtration media, such as a filtration cartridge). Moreover, in certain embodiment, the interior of the mask may define a breathing chamber including the interior volume within the sealed area in fluid communication with the intake and/or exhaust valves such that air can pass between the intake and/or exhaust valves and the breathing chamber. The breathing chamber may be configured to enclose the user's mouth and/or nose therein, and may be surrounded by the seal discussed above. The seal may separate the breathing chamber from an unsealed volume within the interior of the mask body. As discussed herein, the unsealed volume within the mask body may be defined between the strap engagement portion 210 of the face mask component 110 and the face engagement portion 220 of the face mask component. The unsealed volume within the mask body may enclose a portion of a strap pathway 400 within the interior of the mask body between strap engagement features (e.g., between strap engagement features 140 and 150 and/or between strap engagement features 145 and 155). The strap pathway 400 may extend around the breathing chamber in certain embodiments without passing into the breathing chamber defined by the face engagement component 220 and the face of the user (e.g., the breathing chamber may be created via the sealing of the face engagement component 220), such that the strap pathway does not create air leaks into the breathing chamber. In certain embodiments, the breathing chamber may be defined by a separate component that may be detachably secured relative to the strap engagement component 210. In such embodiments, the separate breathing chamber component (e.g., the face engagement component 220) may comprise the one or more intake and/or exhaust valves, the seal, and/or other components configured to provide a user with a desirable breathing environment within the interior of the breathing chamber.

The straps (e.g., first strap 115 or second strap 120) of certain embodiments may each extend along a strap length between a first end and an opposite second end. As discussed herein, the first end of a strap may be embodied as a head support end 160, 165, and a second end of a strap may be embodied as an attachment end 170, 175. The straps further define a width, measured perpendicular to the length, and a thickness, measured perpendicular to both the length and the width. It should be understood that the straps may comprise a flexible material, such as a woven material, and the thickness of the strap may correspond to the thickness of individual fibers within the strap. In certain embodiments, the length of a strap may be adjustable (e.g., via an adjustment mechanism at one or both ends of the strap).

As used herein, the terms top edge and bottom edge refer to a relative top or bottom in an instance the face mask component is position on a user's face. For example, the top edge of a strap engagement feature may be closer to the eyes of a user than the bottom edge of a the strap engagement feature.

In some embodiments, the face mask component 110 may define one or more strap engagement features (e.g., strap engagement features 140, 145, 150, 155), such as grooves or other apertures passing through the mask body component 110 between an exterior surface and an interior surface of the face mask component 110 configured to receive a strap (e.g., first strap 115 or second strap 120) extending through the mask (e.g., the first strap 115 may extend through strap engagement feature 140 and strap engagement feature 150; and the second strap 120 may extend through strap engagement feature 145 and strap engagement feature 155). Each strap engagement feature may extend through the mask body (e.g., through the strap engagement component 210). The strap engagement features may be characterized by at least one width (e.g., an overall width) and at least one height (e.g., a first height and/or a second height). In various embodiments, certain strap engagement features may be embodied as a dynamic strap engagement feature or a secondary strap engagement feature.

In some embodiments, as discussed in more detail with reference to FIGS. 2A-2F, the dynamic strap engagement feature may define an overall width (e.g., extending between a first side edge 270 (shown in FIG. 2A) and a second side edge 275 (shown in FIG. 2A)), and two discrete portions with different widths (collectively, the widths of the discrete portions embody the overall width). In an example embodiment, the dynamic strap engagement feature may define a slide portion (e.g., the slide portion 250 shown in FIG. 2A) having a first width extending between a first side edge 270 and a transition point 280, and a first height extending between a top edge 285 of the slide portion and a bottom edge 290 of the slide portion, wherein the slide portion is configured to allow a strap to move relatively freely (e.g., the width of the slide portion of the dynamic strap engagement feature may be larger than the width of the strap passing through and the height of the slide portion of the dynamic strap engagement feature may be substantially larger than the thickness of the strap passing through) and a locking portion (e.g., the locking portion 260 shown in FIG. 2A) having a second width extending between a second side edge 275 and the transition point 280 and a second height extending between a top edge 240 of the locking portion and a bottom edge 290 of the locking portion, wherein the locking portion is configured to frictionally resist motion of a strap. For example, as discussed below, the top edge 240 of the locking portion may define a sharp peak defined by a small radius of curvature configured to provide a high-friction engagement with the strap to frictionally lock the strap in place, such that the strap is impeded from sliding into or out of the dynamic strap engagement feature as a result of unintentionally applied forces (e.g., bumping the mask, gently tugging on the mask, and/or the like), and may have a height that is smaller than the height of the slide portion and that is minimally larger than the thickness of the strap. By contrast, the slide portion of the dynamic strap engagement feature may be characterized by a top edge 285 having a gradual radius of curvature (e.g., a radius of curvature larger than the radius of curvature of the locking portion) so as to facilitate movement of the strap therein. In certain embodiments, the width of the slide portion of the dynamic strap engagement feature may be at least substantially equal to the width of the locking portion of the dynamic strap engagement feature. In other embodiments, the width of the slide portion of the dynamic strap engagement feature may be larger than the width of the locking portion of the dynamic strap engagement feature. For example, the width of the slide portion of the dynamic strap engagement feature may be wider than the width of the strap, and the width of the locking portion of the dynamic strap engagement feature may be narrower than the width of the strap.

In some embodiments, one or more of the strap engagement features may be a secondary strap engagement feature. In various embodiments, a secondary strap engagement feature may have a width extending between a first side edge of the secondary strap engagement feature and a second side edge of the secondary strap engagement feature with a uniform height between a top edge of the secondary strap engagement feature and a bottom edge of the secondary strap engagement feature. The width of the secondary strap engagement feature may be larger than the width of the strap, and the height of the secondary strap engagement feature may be substantially larger than the thickness of the strap, such that a strap passing therethrough may move relatively freely (e.g., there may be some frictional resistance, but the strap may generally move freely). In certain embodiments, the height of the secondary strap engagement feature may be at least substantially equal to the height of the slide portion of the dynamic strap engagement feature. In some embodiments, the width of a secondary strap engagement feature may be at least slightly larger than the width of the strap. In some embodiments, the width of a secondary strap engagement feature may be less than the overall width of a dynamic strap engagement feature configured to receive the same strap width. For example, the secondary strap engagement feature may have a similar width to the width of the slide portion of the a dynamic strap engagement feature. In an example embodiment, the upper strap engagement features 140, 145 may be dynamic strap engagement features, while the lower strap engagement features 150, 155 may be secondary strap engagement features.

In an example embodiment, as shown in FIG. 1, the first strap 115 may be configured to pass through the strap engagement features 140 and 150, such that the portion of the first strap 115 located between the strap engagement features 140 and 150 is positioned within an interior of the face mask component 110. In some embodiments, strap engagement feature 140 may be a dynamic strap engagement feature. In some embodiments, the strap engagement feature 150 may be a secondary strap engagement feature. As discussed in reference to FIG. 4 below, the first strap 115 may also pass through a strap pathway 400 within the interior of the face mask component (e.g., between the strap engagement feature 140 and strap engagement feature 150). In some embodiments, the strap pathway 400 may provide an additional torsional force on the first strap 115 during operation.

In an example embodiment, as shown in FIG. 1, the second strap 120 may be configured to pass through the strap engagement features 145 and 155, such that the portion of the second strap 120 located between the strap engagement features 145 and 155 is positioned within an interior of the face mask component 110. In some embodiments, strap engagement feature 145 may be a dynamic strap engagement feature. In some embodiments, the strap engagement feature 155 may be a secondary strap engagement feature. As discussed in reference to FIG. 4 below, the second strap 120 may also pass through a strap pathway 400 within the interior of the face mask component (e.g., between the strap engagement feature 145 and strap engagement feature 155). In some embodiments, the strap pathway 400 may provide an additional torsional force on the second strap 120 during operation.

In some embodiments, the first strap 115 may have a head support end 160 that is attached to the head support component 125 and an opposite attachment end 170 configured to operably couple with the second strap 120 (e.g., such as via the buckle 130 shown in FIG. 1 or otherwise). In some embodiments, the second strap 120 may have a head support end 165 that is attached to the head support component 125 and an attachment end 175 configured to operably couple with the first strap 115 (e.g., such as via the buckle 135 shown in FIG. 1 or otherwise). In various embodiments, the first strap 115 and the second strap 120 may comprise a synthetic material (e.g., polypropylene threads), a natural material, a combination of natural and synthetic threads, and/or the like.

In some embodiments, the head support component 125 may be configured to encircle the user's head during operation. Various different head support components may be used to hold the face mask assembly 100 in place during operation (such as the head support component shown in FIGS. 5A-6B). In some embodiments, the first strap 115 and/or the second strap 120 may be a unitary piece with the head support component 125 (e.g., the first strap 115 and the second strap 120 may be attached at the head support end 160, 165 of each respective strap. In some embodiments, the head support component 125 may be made out of a plastic material, such as polypropylene, although other materials may be utilized in certain embodiments. For example, the head support component 125 may be made, either partially or fully, out of textile webbing or netting, or rubber. Various other head support component 125 may be contemplated in accordance with various embodiments of the present disclosure.

Figure 2A:
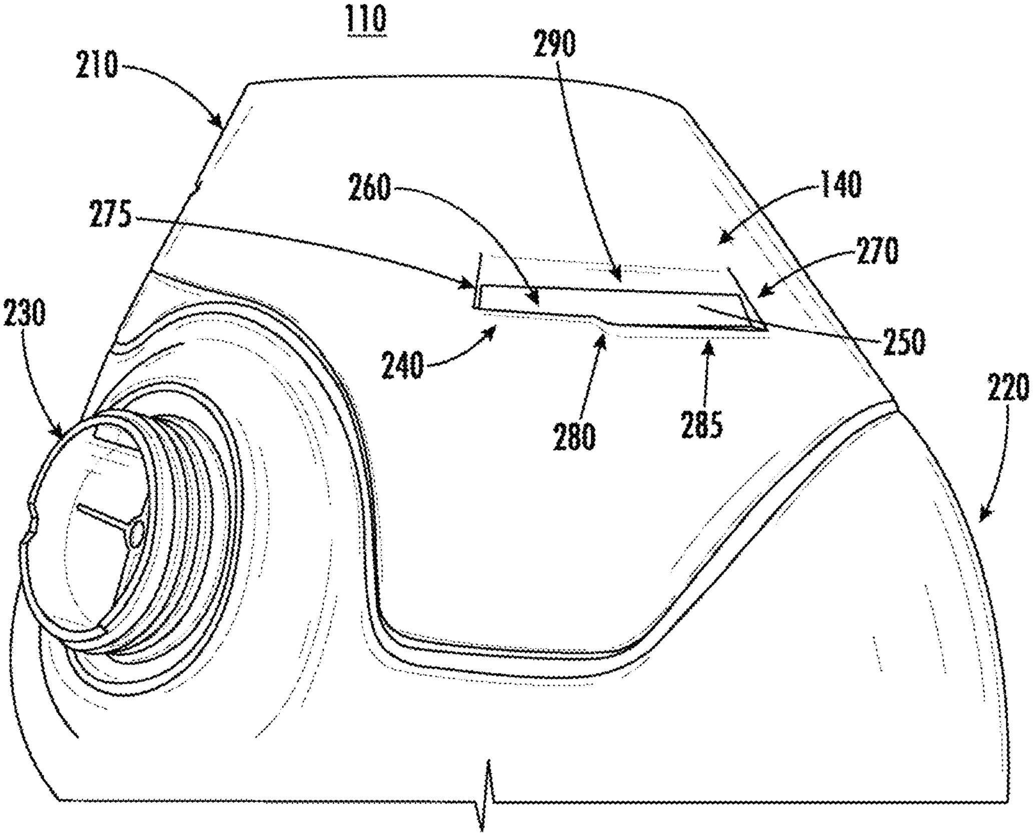
FIGS. 2A-2F are multiple views of a dynamic strap engagement feature of a face mask component in accordance with an example embodiment of the present disclosure.

Referring now to FIGS. 2A-2F, various views of the mask assembly component 110, and specifically a dynamic strap engagement feature (e.g., strap engagement features 140, 145), are shown in accordance with example embodiments of the present disclosure. As shown in FIG. 2A, the face mask component 110 may comprise a plurality of pieces (e.g., a strap engagement portion 210 and a face engagement portion 220) configured to removably attached to one another. In some embodiments, the strap engagement portion 210 may include one or more strap engagement features (e.g., dynamic strap engagement features and/or secondary strap engagement features), one or more strap pathway 400 (shown in FIG. 4), a filter cover 410, and/or the like. In some embodiments, the face engagement portion 220 may include one or more filter attachments (e.g., configured to receive filter cartridges), one or more built-in filters, a component defining a breathing chamber configured to seal to the face of a user around the user's mouth and/or nose, and/or the like.

In various embodiments, one or more of the strap engagement features may be a dynamic strap engagement feature. In some embodiments, the relative angle of the strap engagement feature with the strap pathway 400 may create a fold at an acute angle in the strap around an edge of the dynamic strap engagement feature (e.g., less than 90 degrees, less than 45 degrees, and/or the like), such that in an instance the strap enters the locking portion 260, the interior of the acute angle of the strap engages with the sharp edge of the locking portion 260 (e.g., restrictive edge 240). In some embodiments the upper strap engagement features 140, 145 may be located above the center of gravity of the face mask component 110, such that the frictional force provided by the locking portion assists to counteract rotational movement of the mask (e.g., about a pivot point located proximate a bottom portion of the face mask component 110, which may be located proximate a user's chin when donned) caused at least in part by the weight of the face mask component 110 being centered at a location laterally away from a user's face (and the back side of the mask). In an example embodiment, the part of the strap between the head support component 125 and the dynamic strap engagement feature (e.g., dynamic strap engagement feature 140, 145) may be close to approximately 90 degrees from the dynamic strap engagement feature in the donned position. For example, an angle measured between the length of the portion of the strap extending away from the dynamic strap engagement feature toward the heat support component 125, and the width of the dynamic strap engagement feature is at least approximately 90 degrees when the mask is in the donned position, so as to desirably maintain the strap within the locking portion of the dynamic strap engagement feature while in the donned position.

Figure 2B:
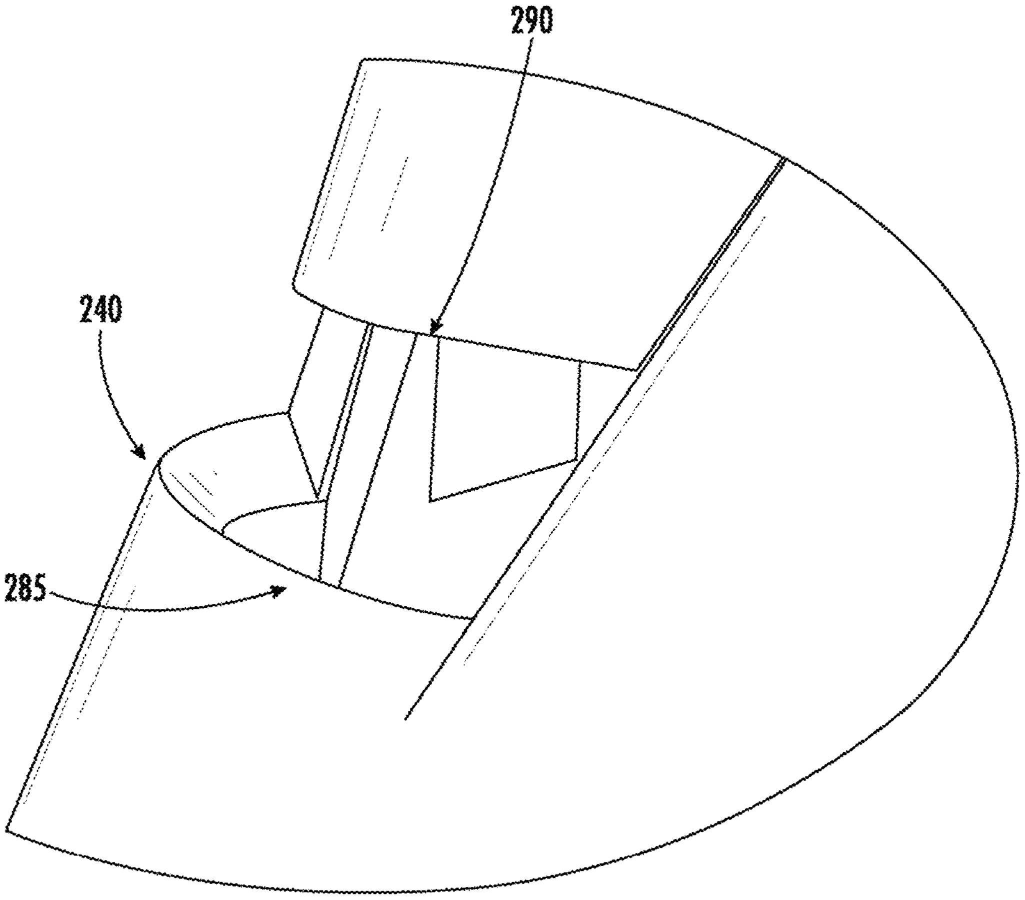
Figure 2C:
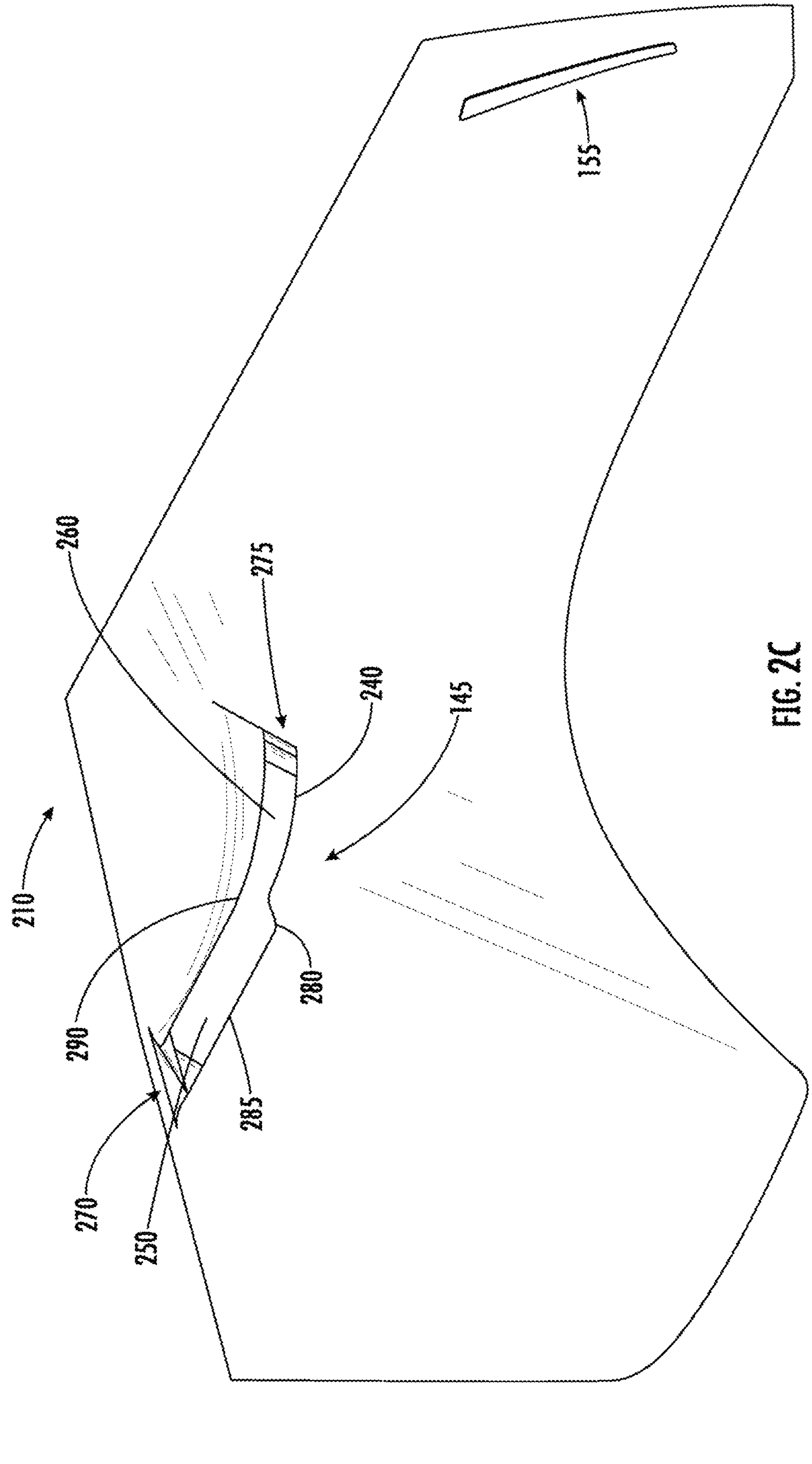

In an example embodiment, the strap engagement features 140, 145 may both be a dynamic strap engagement feature configured with a slide portion 250 and a locking portion 260 as discussed above. As shown in FIGS. 2A-2C, the slide portion 250 of the strap engagement feature 140 may have an opening generally wider than the strap passing through. Additionally, as shown in FIG. 2C, the slide portion 250 may have a smooth (e.g., rounded having a relatively large radius of curvature as compared with the smaller radius of curvature of the sharp edge of the restrictive edge 240) top edge 285 that provides minimal frictional resistance to strap passing through (e.g., the face mask component 110 may generally freely move along a given strap), even if the mask is positioned such that the strap pathway 400 forms an acute angled fold across the top edge of the slide portion 250. In some embodiments, the locking portion 260 may be configured with a sharp edge (e.g., restrictive edge 240). such that a strap may be restricted from moving in an instance the strap is in the locking portion 260. In some embodiments, the sharp edge of the locking portion 260 may frictionally engage and frictionally lock the strap when in operation. As shown in FIG. 2A, the locking portion 260 may have a restrictive edge 240 defining a sharp peak having a small radius of curvature configured to provide friction with a strap during operation.

In some embodiments, the width of the locking portion 260 may be less than the width of the slide portion 250. For example, the locking portion 260 may have a width less than the width of the strap to be received, such that the sharp edge may only engage a portion of the strap at a given time. Alternatively, the width of the locking portion 260 may be similar to or the same as the width of the slide portion 250. For example, the locking portion 260 may be defined to receive the entire width of the strap at a given time. In an example embodiment, the restrictive attributes of the dynamic strap engagement feature may begin to be experienced in an instance any of the strap is in the locking portion 260. For example, as the strap moves from the slide portion 250 to the locking portion 260, the movement of the face mask component 110 along the strap may begin to be restricted somewhat until a sufficient amount of the strap is within the locking portion to sufficiently prevent motion of the face mask component.

In various embodiments, the locking portion 260 may also have a smaller height opening than the slide portion 250. For example, the height of the locking portion may be approximately 2.4 millimeters in an instance the height of the slide portion 250 is approximately 3.3 millimeters. In such embodiments, there may be a transition area between the slide portion 250 and the locking portion 260 of a dynamic strap engagement feature, such that the strap may move between the slide portion 250 and the locking portion 260 during operation. In various embodiments, the strap engagement feature 145 may also be similar to the strap engagement feature 140 discussed above. As discussed above, the top edge 240 of the locking portion 260 may differ from the top edge 285 of the slide portion 250. As shown, the top edge of the locking portion 260 is embodied as a restrictive edge 240 defining a sharp peak having a small radius of curvature to engage the strap and create a high frictional force with the strap. By contrast, the top edge 285 of the slide portion 250 is defined by a larger radius of curvature (having a radius of curvature larger than the restrictive edge 240) configured to enable the strap to slide easily across the top edge of the slide portion 250. As illustrated, the bottom edge 290 of the dynamic strap engagement feature may be uniform across the overall width of the dynamic strap engagement feature. As shown, the bottom edge 290 of the dynamic strap engagement feature is defined by a gentle slope configured to facilitate the strap sliding into and out of the dynamic strap engagement feature when sliding thereon. When the face mask assembly 100 is placed in a donned position against a user's face, the described top edge 240 of the dynamic strap engagement feature is positioned closer to the user's face than the described bottom edge. Thus, with the strap extending out of the dynamic strap engagement feature, along a side of the user's face, and to the head support component 125, the strap transitions across one of the top edge of the slide portion 250 or the top edge of the locking portion 260 (the restrictive edge 240) to provide desirable functionality to enable adjustment of the mask and/or to lock the mask in place against a user's face. In various embodiments, the dynamic strap engagement feature may have a transition component between the slide portion 250 and the locking portion 260, such that the strap may transition between the slide portion 250 and the locking portion 260 more effectively. For example, the transition component may be a sloped edge near the transition point 280 of the dynamic strap engagement feature along the top edge of the dynamic strap engagement feature that allows for a gentle transition between the top edge 285 of the slide portion 250 and the top edge 240 of the locking portion 260.

Figure 2D:
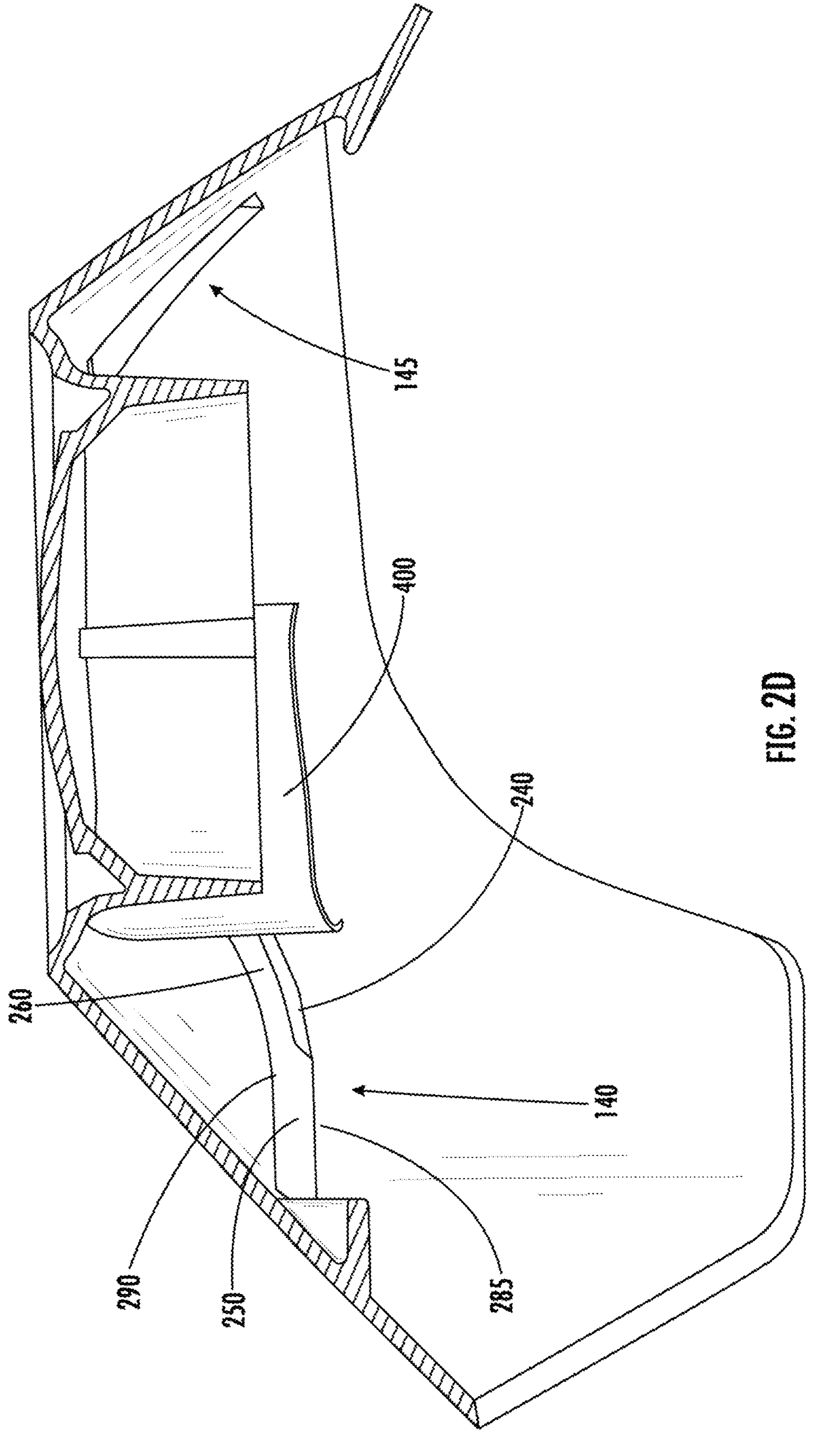

Referring now to FIG. 2D, a sectional view of the interior of a dynamic strap engagement feature is shown in accordance with an example embodiment. In some embodiments, the restrictive edge 240 of the locking portion 260 may be an exterior feature, such that there are no internal protrusions as shown in FIG. 2D.

Figure 2E:
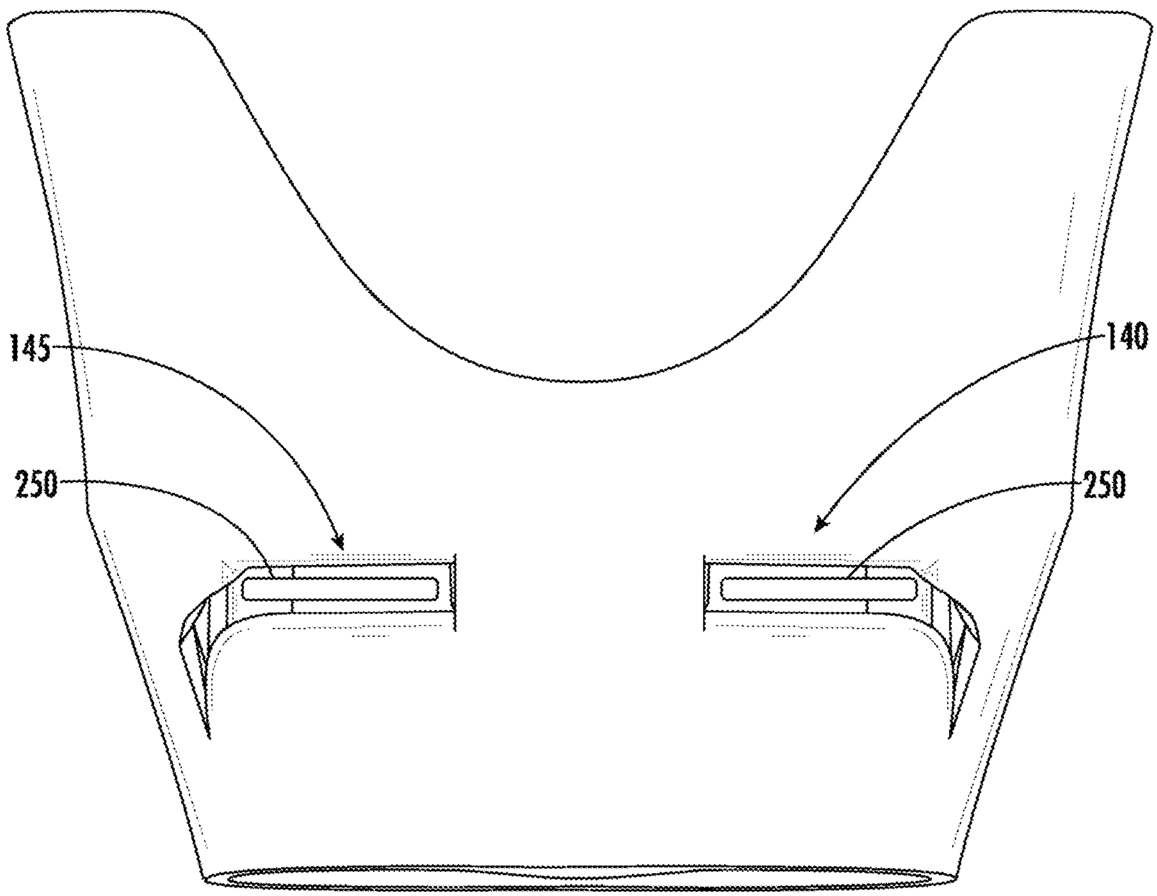
Figure 2F:
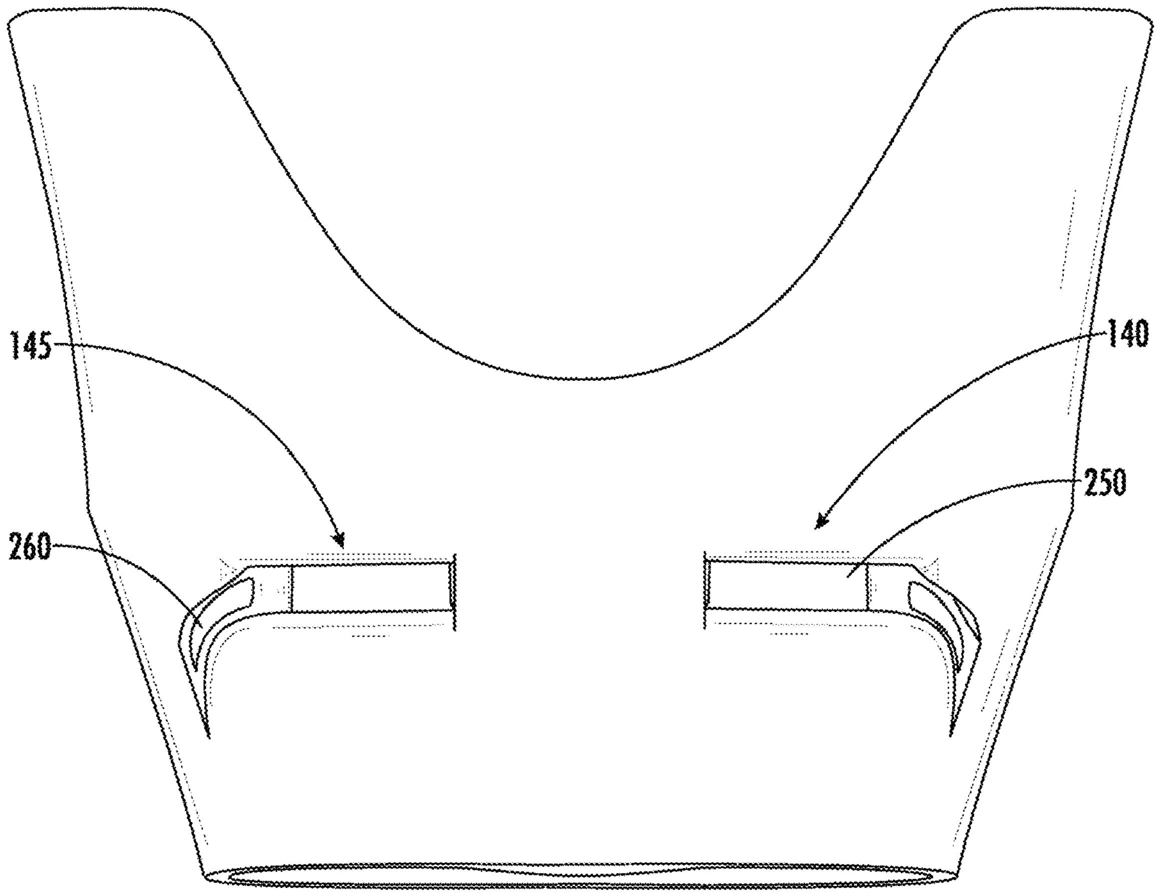

Referring now to FIG. 2E, which illustrates a top view of the face mask component 110 according to an embodiment, the slide portion 250 is shown in an example embodiment where both strap engagement features 140, 145 are dynamic strap engagement features. In some embodiments, the slide portion 250 of the dynamic strap engagement feature may be located at a top portion of the face mask component 110 when in use (e.g., as shown by the highlighted area in strap engagement features 140, 145 of FIG. 2E), such that a strap extending through the dynamic strap engagement feature is naturally within the slide portion 250 when the mask is in a drop-down position. Accordingly, with reference to FIG. 2F, the locking portion 260 is located below the slide portion 250, such that a strap extending through the dynamic strap engagement feature moves into the locking portion 260 naturally, when the face mask component 110 is moved to the donned position, and the orientation of the strap extending between the dynamic strap engagement portion and the head support component 125 causes the strap to slide into the locking portion 260. In some embodiments, the locking portion 260 may be defined with a curvature (e.g., as shown by the highlighted area in strap engagement features 140, 145 of FIG. 2F).

Figure 5A:
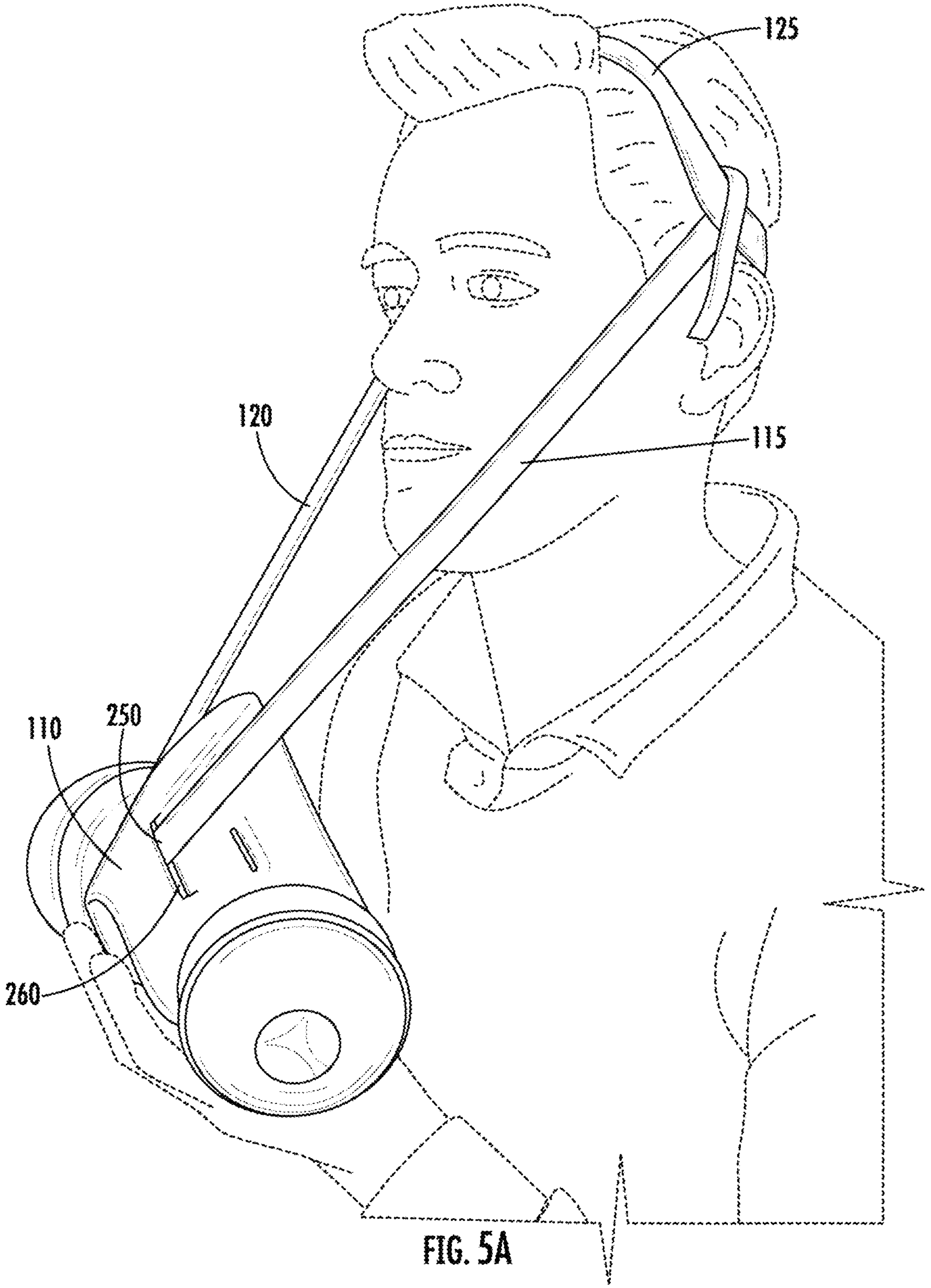
FIGS. 5A-5C illustrates various positions of the face mask assembly on a user in accordance with an example embodiment of the present disclosure.
Figure 5B:
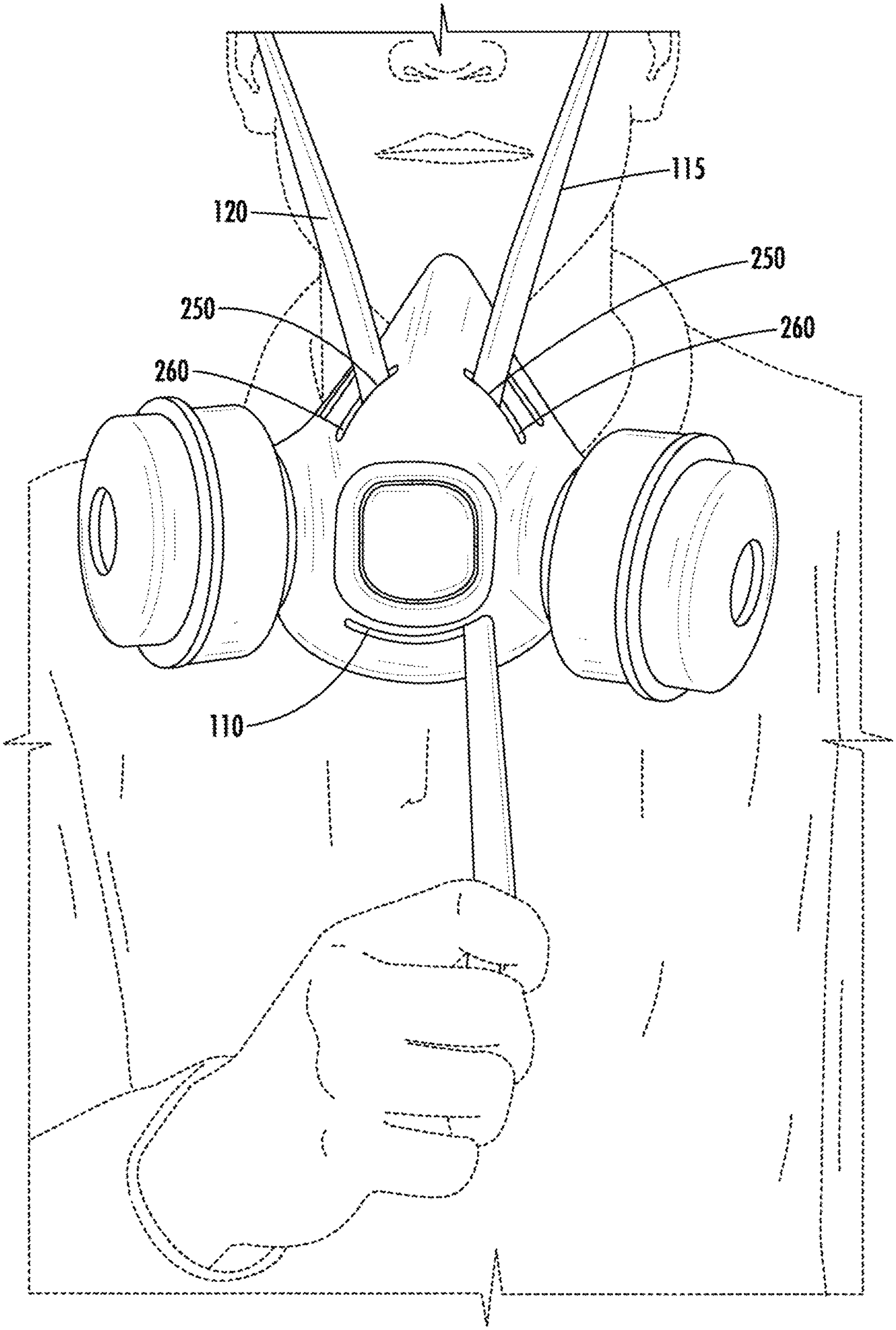
Figure 5C:
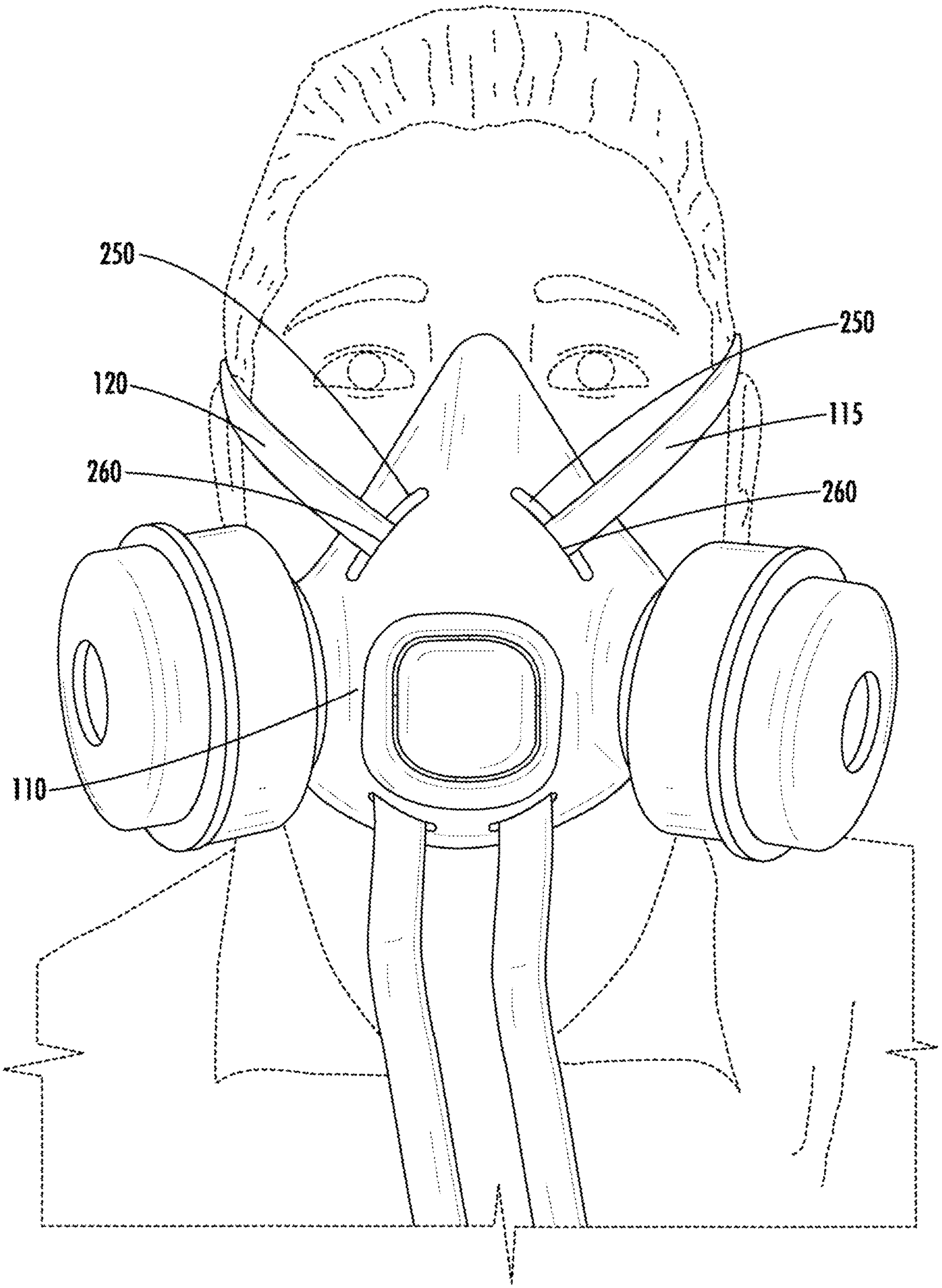

As shown in more detail in FIG. 5C, as the face mask component 110 is moved to the user's face, the straps 115, 120 travel downward from the slide portion 250 of the dynamic strap engagement feature into the locking portion 260 of the dynamic strap engagement feature. In such embodiments, the top edge 240 of the locking portion (e.g., the restrictive edge) comes into contact with the strap such that the design of the locking portion 260 provides a frictional restriction on the movement of the face mask component 110 along the given strap.

Figure 3A:
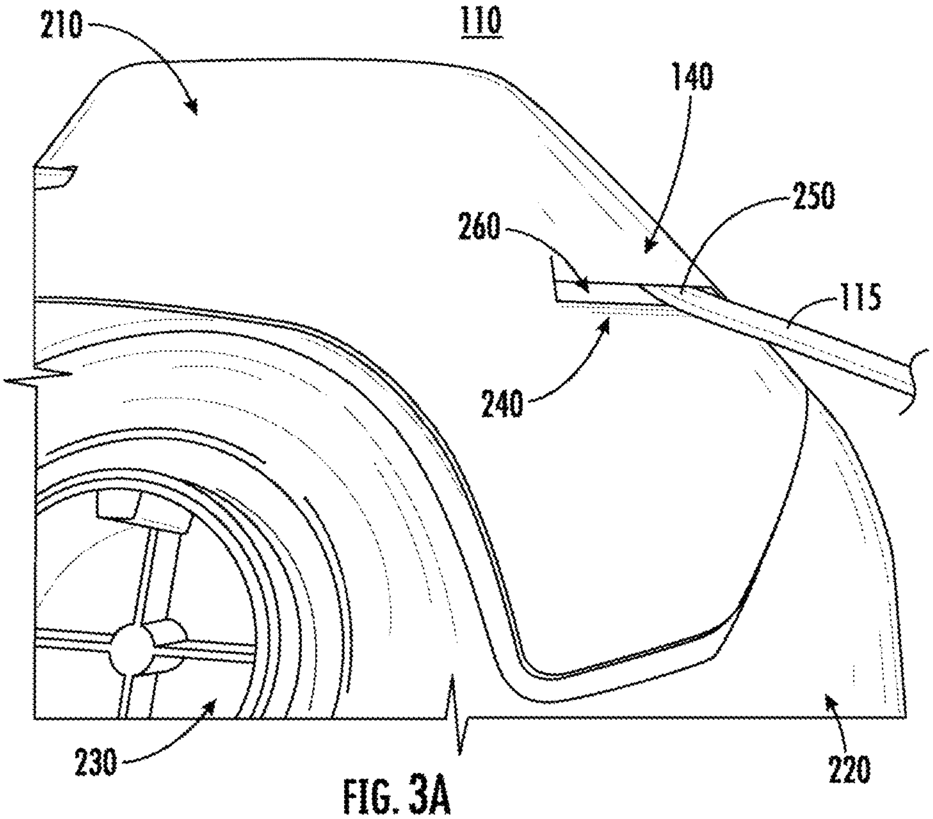
FIGS. 3A-3B illustrate the interaction between a dynamic strap engagement feature and a strap in both a drop down position (FIG. 3A) and a donned position (FIG. 3B) in accordance with an example embodiment of the present disclosure.
Figure 3B:
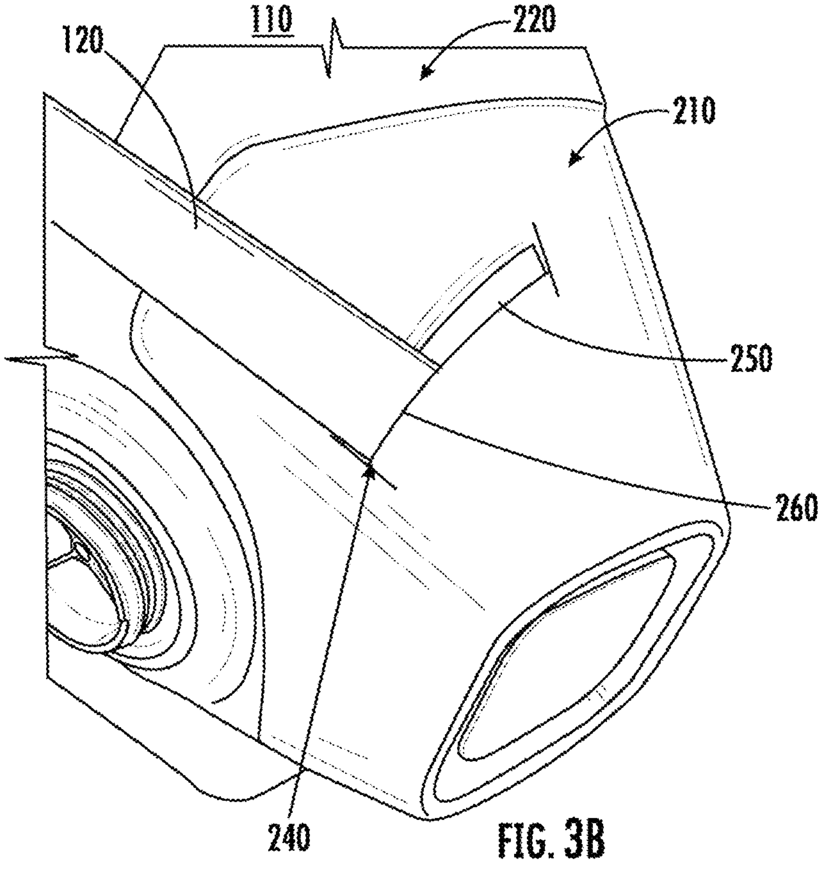

Referring now to FIGS. 3A and 3B, a strap (e.g., the first strap 115 or second strap 120) is shown interacting with a dynamic strap engagement feature (e.g., strap engagement feature 140 or 145). As shown in FIG. 3A, the strap (e.g., first strap 115) may be in the drop down position and the strap (e.g., first strap 115) may be within the slide portion 250 of the dynamic strap engagement feature (e.g., dynamic strap engagement feature 140), such that the strap may move with little to no frictional restriction on the strap from the strap engagement feature.

As shown in FIG. 3B, the strap (e.g., second strap 120) may be in the donned position against a user's face. As shown, in an example embodiment, the strap (e.g., second strap 120) may be at least partially within the locking portion 260 of the dynamic strap engagement feature (e.g., dynamic strap engagement feature 145), such that the locking portion 260 frictionally restricts the motion of the strap during operation. In some embodiments, there may be an intermediate position between the drop down position and the donned position such that the strap is partially in the locking portion 260 and partially in the slide portion 250 of the strap engagement feature, such that the strap is frictionally restricted, but less than an instance the strap is completely in the locking portion 260 of the strap engagement feature.

Figure 4:
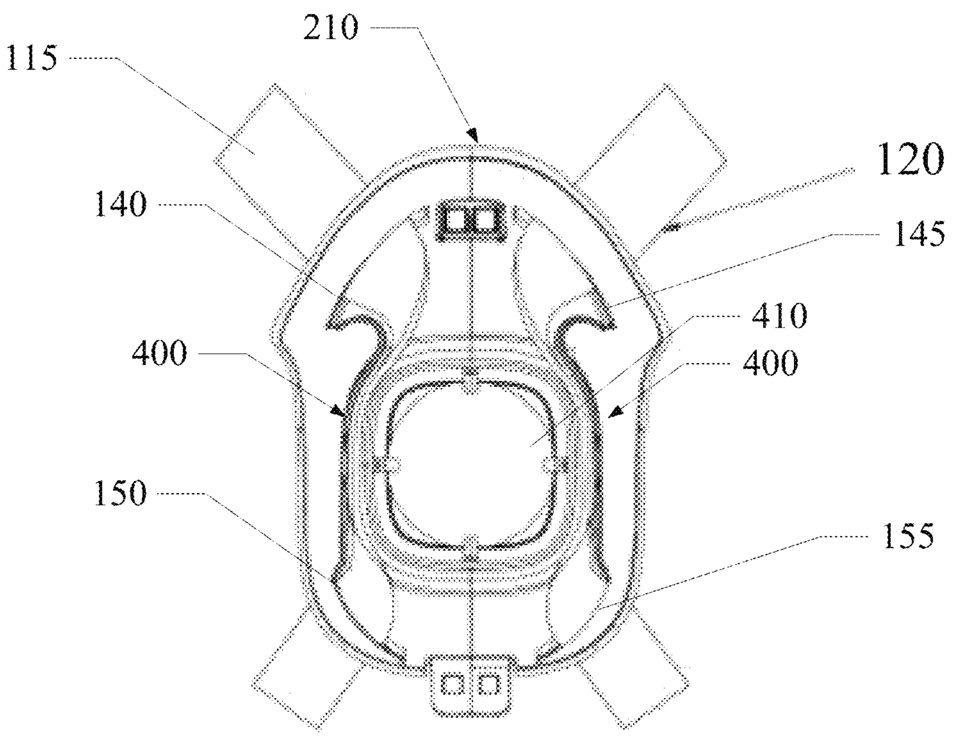
FIG. 4 is an interior view of the face mask component with multiple straps configured within the face mask component in accordance with an example embodiment of the present disclosure.

Referring now to FIG. 4, the interior of the strap engagement portion 210 of the face mask component 110 is shown in accordance with an example embodiment. In some embodiments, the strap engagement portion 210 may include one or more strap pathways 400 configured to receive a strap (e.g., first strap 115 or second strap 120). In some embodiments, the strap pathway may be defined between the strap engagement features (e.g., between strap engagement feature 140 and 150 or 145 and 155). In some embodiments, the strap pathway 400 may be defined via protrusions within the strap engagement portion 210 (e.g., in some instance existing structure, such as the valve cover structure 410 of the breathing chamber may also provide at least a portion of a strap pathway 400). As shown in FIG. 4, the strap pathways 400 extend around the protrusions (e.g., portions of the valve cover structure 410), thereby causing the strap to partially twist between a first orientation as the strap passes through the strap engagement features and a second orientation as the strap move around the exterior of the protrusions (e.g., portions of the valve cover structure 410). The twisting configuration of the strap creates a small torsional force on the strap, pressing at least a portion of the strap against the top edge of the dynamic strap engagement feature, thereby forcing the strap to transition through the dynamic strap engagement feature across the top edge of the dynamic strap engagement feature. Because the straps are biased against the top edge of the dynamic strap engagement feature, the strap slides across the large-radius portion of the slide portion or locks against the sharp peak of the locking portion, depending on the orientation of the mask (thereby changing the angle between the mask and the head support component).

Referring now to FIGS. 5 and 6, an example method of operating a face mask assembly of an example embodiment is shown. The steps discussed herein are illustrative and may be performed in various steps in order to use the face mask assembly. As discussed throughout, the face mask assembly 100 of an example embodiment may have a drop-down function to allow the face mask assembly to selectively be held in place on a face of a user during operation. In order to use the face mask assembly 100, the user may first don the head support component 125, such the face mask component 110 hangs at or around the chest of the user (e.g., FIG. 5A). For example, the face mask component 110 may be at or near the attachment ends 170, 175 of the first strap 115 and the second strap 120. At this point, the attachment ends 170, 175 of the first strap 115 and the second strap 120 may not be attached to one another as discussed above. Moreover, as shown, the first strap 115 and the second strap 120 may be positioned within the slide portion 250 of the dynamic strap engagement features when in the drop-down configuration such that the straps 115, 120 may slide across the large radius slide portion of the top edge of the dynamic strap engagement features.

As shown in FIG. 5B, in order to don the mask assembly component 110 for use, the user may hold the first strap 115 and the second strap 120 at or near the attachment ends 170, 175 of the straps. For example, the user may grab both the first strap 115 and the second strap 120 with one hand. As shown in FIG. 5B, the first strap 115 and the second strap 120 may be in the slide portion 250 (shown in FIG. 2A) within the respective dynamic strap engagement feature 140, 145.

After grabbing the first strap 115 and the second strap 120, the user may lift the face mask component 110 along the straps (e.g., such as by using the other hand not holding the straps) up until the face mask component 110 is placed on the face of the user as expected for use (e.g., FIG. 5C). As the face mask component 110 is moved from the drop down position to the donned position, as shown in FIG. 5C, the first strap 115 and the second strap 120 move into the locking portion 260 (shown in FIG. 2A) of the respective dynamic strap engagement feature 140, 145, such that the movement of the face mask component 110 along each strap is restricted.

Figure 6A:
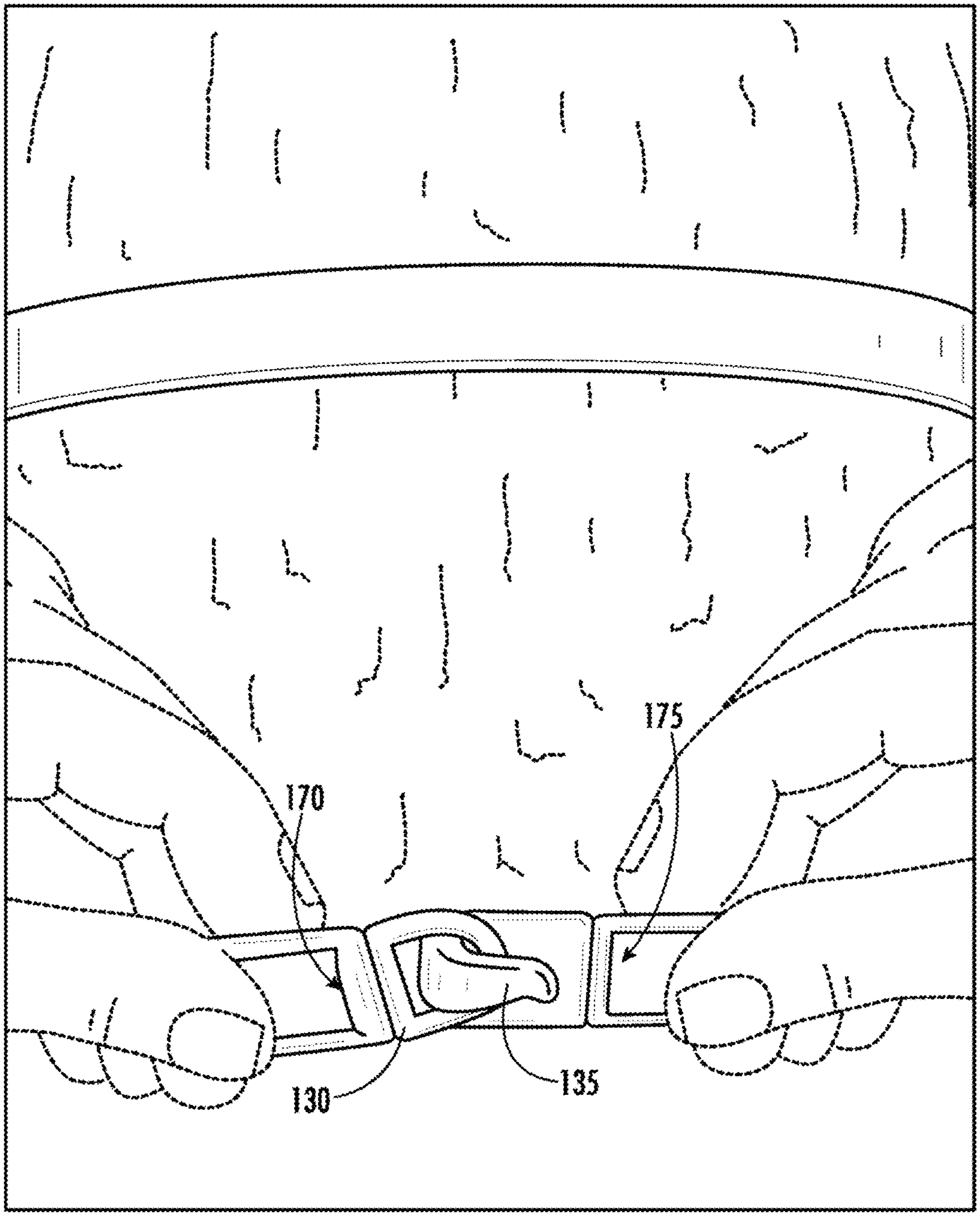
FIG. 6A-6B illustrate the face mask assembly in an instance the face mask assembly is in the donned position in accordance with an example embodiment of the present disclosure.

Once the face mask component 110 is coupled with the face of the user (e.g., the movement of the face mask component 110 is restricted), the user may be able to stop holding the face mask component 110 without the face mask component moving. In such an example, the user may move the attachment end 170, 175 of the first strap 115 and the second strap 120 around the neck of the user and attach the straps 115, 120 together (e.g., buckle the straps 115, 120 together as shown in FIG. 6A). During the attaching of the first strap 115 and the second strap 120, the straps being in the locking portion 260 of the respective dynamic strap engagement feature 140, 145 may allow the face mask component 110 to remain in place on the face and prevent the face mask component 110 from sliding along the straps. The restriction preventing movement of the face mask component 110 may be caused by the friction between the respective dynamic strap engagement feature 140, 145 and the respective straps 115, 120.

Figure 6B:
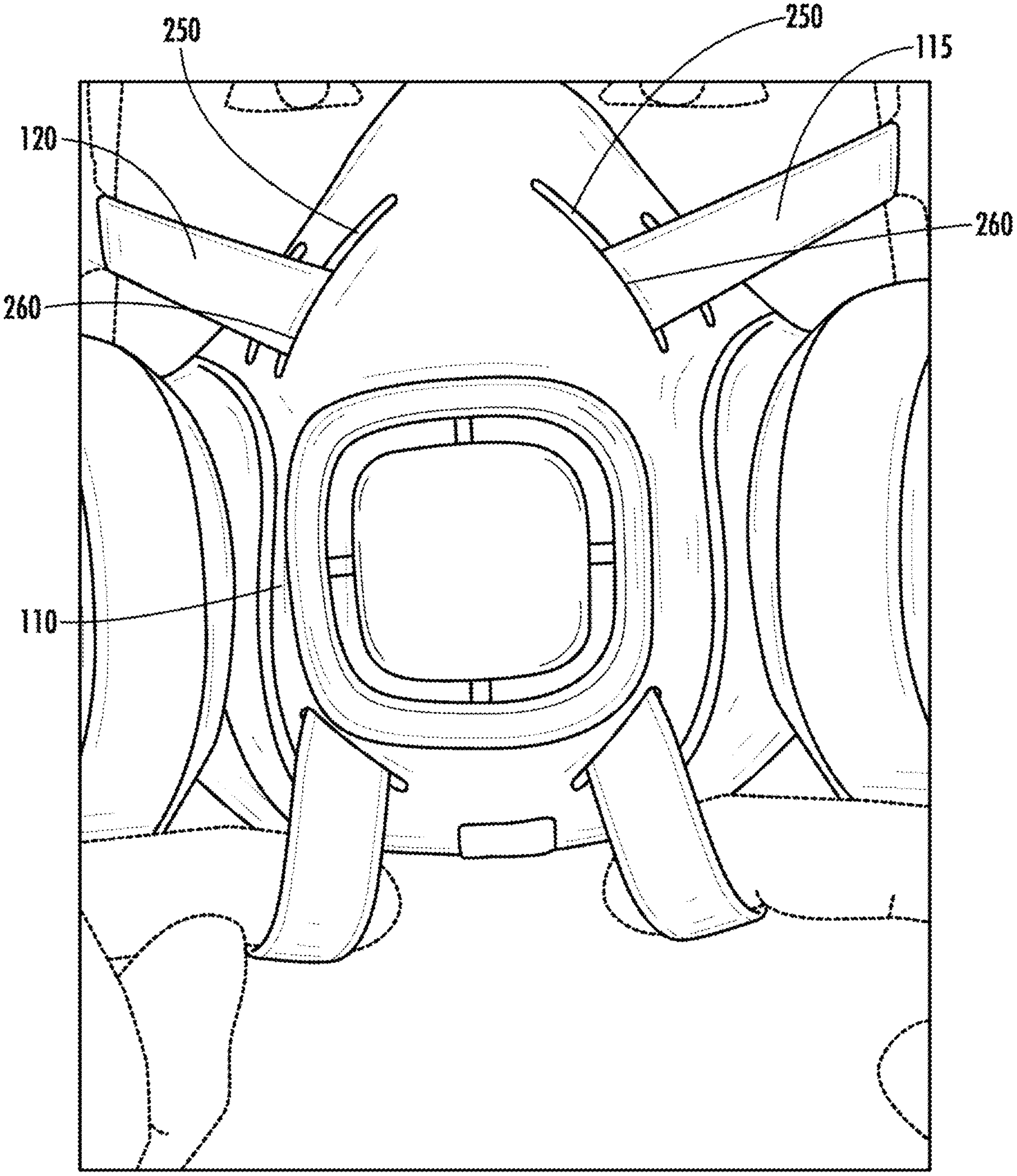

In an instance the first strap 115 and the second strap 120 are attached to one another behind the neck of the user, the user may then adjust the tension of the straps 115, 120 at the head support end 160, 165 and/or the attachment end 170, 175 of the straps. For example, the head support component 125 and/or the attachment buckle 130, 135 may allow for a user to adjust the tension of the strap. As shown in FIG. 6B, the tensioning may allow for the face mask component 110 to be sealed comfortably to the face of the user (e.g., to protect the user against contaminants in the air).

Figure 7:
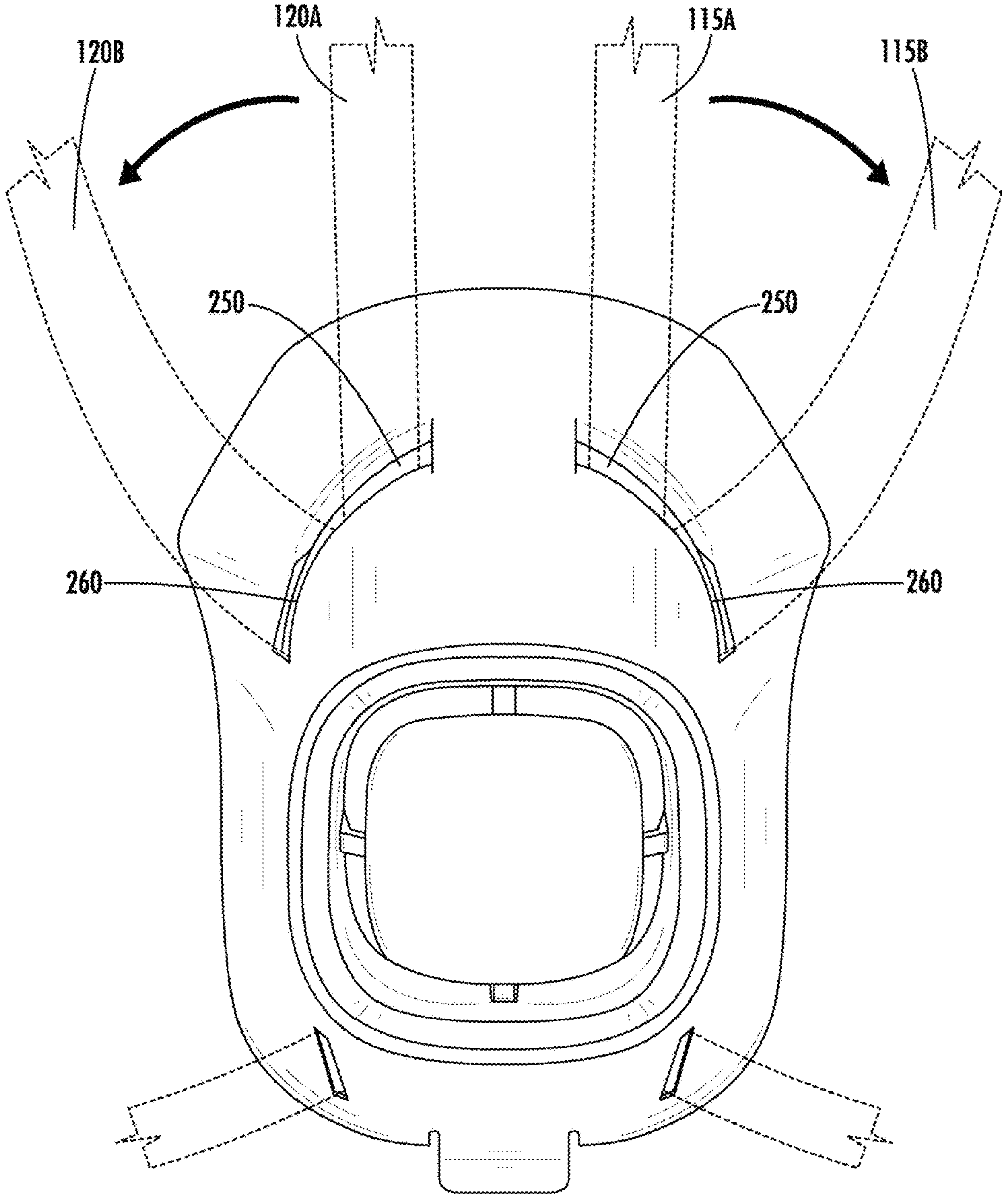
FIG. 7 illustrates the location of the straps within dynamic strap engagement features in the donned position and the removed position in accordance with an example embodiment of the present disclosure.

Referring now to FIG. 7, the position of each strap 115, 120 within a given dynamic strap engagement feature is shown. As shown, the straps 115A, 120A are in the slide portion 250 of the respective dynamic strap engagement feature (e.g., in the drop-down or removed position), such that the face mask component 110 may slide along the straps. As the face mask component 110 is moved to the face of a user (e.g., as shown in FIGS. 5C), the straps 115, 120 move as shown by the arrow until the straps are in the donned position (e.g., straps 115B, 120B). In such an example, the straps 115B, 120B are in the donned position when the straps are in the locking portion 260 of the respective dynamic strap engagement feature, such that the face mask component 110 may not move along the straps 115B, 120B. As discussed herein, the face mask component 110 movement may be restricted via frictional resistance.

During operation of the face mask assembly 100, the face mask component 110 may need to remain stable on the face of the user, even in instances the face mask component 110 is equipped with heavy filter cartridges and/or in instances the user makes sudden head movements. The locking portions 260 of the dynamic strap engagement features 140, 145 may be configured to provide sufficient frictional resistance to each respective strap 115, 120 that the face mask component 110 may not substantially move even with heavy filter cartridges and/or sudden movements (e.g., preventing any contaminants from reaching the user due to a leakage in sealing of the face mask component 110). Additionally, the face mask component 110 may be removed from the face of the user quickly since in an instance the user moves the first and second strap to a straight and parallel position relative to one another (e.g., the user may unbuckle the attachment ends 170, 175 of the straps and hold the straps parallel to one another similar to the way they are shown in FIG. 5B), the face mask component 110 may travel along the straps (e.g., into the drop down position).

The ability to quickly transition between the donned position and the drop down position allows for a more efficient user experience, especially in situations where a user may have to quickly alternate between donning the face mask assembly and removing the face mask assembly. The dynamic strap engagement features also allow for increased manufacturability over external locks that are added to existing face masks as there are not any additional components needed for the face mask.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A face mask assembly configured with a drop-down feature, the face mask assembly comprising:

a face mask component slidable along a length of at least a first strap, wherein the face mask component comprises a first dynamic strap engagement feature as an aperture passing through the face mask component between an exterior surface and an interior surface of the face mask component, wherein the first dynamic strap engagement feature is configured to engage the first strap, wherein the first dynamic strap engagement feature is characterized by an overall width extending between a first side edge and a second side edge, wherein the first dynamic strap engagement feature defines a slide portion and a locking portion, the slide portion being characterized by a first width defined between the first side edge and a transition point and the locking portion being characterized by a second width defined between the transition point and the second side edge, wherein the slide portion has an opening height larger than an opening height of the locking portion;

wherein the slide portion comprises a smooth strap engagement edge provided along at least a portion of the first width such that the face mask component is slidable along the length of the first strap while the first strap is positioned within the slide portion, wherein the locking portion comprises a sharp strap engagement edge provided along at least a portion of the second width; the sharp strap engagement edge being configured to provide frictional restriction to the first strap during operation such that face mask component is locked relative to the length of the first strap while the first strap is positioned within the locking portion;

wherein a first radius of curvature of a top edge of the slide portion is larger than a second radius of curvature of the locking portion, wherein the face mask component is configured to be placed in one of a donned position, an intermediate position or a drop-down position, wherein in an instance the face mask component is in the donned position, the first strap is positioned within the locking portion of the first dynamic engagement feature and a movement of the first strap is restricted, wherein in an instance the face mask component is in the drop-down position, the first strap is positioned within the slide portion of the first dynamic strap engagement feature, and wherein in an instance the face mask component is in the intermediate position, the first strap is partially in the locking portion of the dynamic strap engagement feature and partially in the slide portion of the dynamic strap engagement feature.

2. The face mask assembly of claim 1, wherein the face mask component further comprises a first secondary strap engagement feature having a uniform height, wherein the first strap is further configured to be received by the first secondary strap engagement feature of the face mask component.

3. The face mask assembly of claim 2, wherein the face mask component further comprises a strap pathway within an interior of the face mask component and extending between the first dynamic strap engagement feature and the first secondary strap engagement feature, wherein the strap pathway is configured to provide additional torsional force to the first strap during operation.

4. The face mask assembly of claim 3, wherein the face mask component further comprises a second dynamic strap engagement feature configured to engage a second strap, wherein the second dynamic strap engagement feature defines a slide portion and a locking portion; wherein the face mask component is slidable along the length of the second strap while the second strap is positioned within the slide portion, and wherein the face mask component is locked relative to the length of the second strap while the second strap is positioned within the locking portion.

5. The face mask assembly of claim 4, further comprising a head support component, wherein the first strap and the second strap each comprise a head support end and an attachment end, and wherein the first strap and the second strap are attached to the head support component at the head support end of each strap and the attachment ends of each of the first strap and the second strap are removably coupled to one another.

6. The face mask assembly of claim 5, wherein the face mask component comprises a face engagement portion defining a breathing chamber within the interior of the face mask component and a strap engagement portion comprising the first dynamic strap engagement feature.

7. The face mask assembly of claim 6, wherein the overall width of the first dynamic strap engagement feature is defined as a combined width of the first width of the slide portion and the second width of the locking portion, wherein the first width of the slide portion is greater than a third width of the first secondary strap engagement feature.

8. The face mask assembly of claim 7, wherein the first width of the slide portion of the first dynamic engagement feature is at least a strap width of the first strap.

9. The face mask assembly of claim 8, wherein the strap pathway extends around the breathing chamber and is configured to prevent an air leak into the breathing chamber.

10. The face mask assembly of claim 9, secondary strap engagement feature is larger than the strap width of the first strap and a height of the first secondary strap engagement feature is larger than a thickness of the first strap.

11. The face mask assembly of claim 10, wherein the height of the first secondary strap engagement feature is equal to the opening height of the slide portion of the first dynamic strap engagement feature.

12. The face mask assembly of claim 11, wherein the second width of the locking portion is less than the first width of the slide portion such that the sharp strap engagement edge of the locking portion engages a portion of the first strap.

13. The face mask assembly of claim 12, wherein a relative angle between the first dynamic strap engagement feature and the strap pathway, forms an acute angle with the first strap around an edge of the first dynamic strap engagement feature such that in an instance that the first strap is positioned within the locking portion, an interior of the acute angle of the strap engages with the sharp strap engagement edge of the locking portion.

14. The face mask assembly of claim 13, wherein an angle measured between a length of a portion of the first strap, extending away from the first dynamic strap engagement feature toward the head support component, and the overall width of the first dynamic strap engagement feature is 90 degrees, such that the first strap is positioned within the locking portion of the first dynamic strap engagement feature in the instance that the face mask is in the donned position.

15. The face mask assembly claim 14, wherein the first dynamic strap engagement feature comprises a transition component between the slide portion and the locking portion such that the transition component is a sloped edge in proximity to the transition point along the top edge of the first dynamic strap engagement feature.

16. The face mask assembly of claim 15, wherein the sharp strap engagement edge of the locking portion is an exterior feature.

17. The face mask of claim 16, wherein the strap pathway is defined via a plurality of protrusions within the strap engagement portion.

18. A method of donning the face mask assembly of claim 17, the method comprising:

donning of the head support component, by a user, such that the face mask component is proximal to the attachment ends of the first strap and the second strap;

holding of the first strap and the second strap, by the user;

lifting of the face mask component, by the user, until the face mask component is in the donned position;

moving of the attachment end of the first strap and the attachment end of the second strap, by the user, around a neck of the user; and attaching the attachment end of the first strap and the attachment end of the second strap together, by the user.

19. The method of claim 18, further comprising adjusting a tension on the first strap and the second strap, by the user, such that a face mask component is sealed to the face of the user.

20. The method of claim 18, wherein in an instance the face mask component is in the donned position, the first strap is positioned within the locking portion of the first dynamic engagement feature and the movement of the first strap is restricted.

* * * * *